United States Patent
Wang et al.

(10) Patent No.: US 11,067,833 B2
(45) Date of Patent: Jul. 20, 2021

(54) LIQUID CRYSTAL LENS AND LIQUID CRYSTAL SPECTACLES

(71) Applicant: BOE Technology Group Co., Ltd., Beijing (CN)

(72) Inventors: Qian Wang, Beijing (CN); Xiaochuan Chen, Beijing (CN); Wenqing Zhao, Beijing (CN); Chenyu Chen, Beijing (CN); Haiyan Wang, Beijing (CN); Zhongxiao Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 243 days.

(21) Appl. No.: 16/301,860

(22) PCT Filed: Feb. 22, 2018

(86) PCT No.: PCT/CN2018/076965
§ 371 (c)(1),
(2) Date: Nov. 15, 2018

(87) PCT Pub. No.: WO2019/000983
PCT Pub. Date: Jan. 3, 2019

(65) Prior Publication Data
US 2020/0355942 A1    Nov. 12, 2020

(30) Foreign Application Priority Data

Jun. 30, 2017 (CN) .......................... 201710526682.3

(51) Int. Cl.
*G02C 7/08* (2006.01)
*G02F 1/29* (2006.01)

(52) U.S. Cl.
CPC ............... *G02C 7/083* (2013.01); *G02F 1/29* (2013.01); *G02F 1/294* (2021.01); *G02F 2201/122* (2013.01); *G02F 2201/44* (2013.01)

(58) Field of Classification Search
CPC ..... G02C 7/083; G02F 1/29; G02F 2001/294; G02F 2201/122; G02F 2201/44
See application file for complete search history.

(56) References Cited

U.S. PATENT DOCUMENTS 4,909,626 A * 3/1990 Purvis ....................... G01J 1/12
349/145
9,229,267 B2 * 1/2016 Hong ................ G02F 1/133526
(Continued)

FOREIGN PATENT DOCUMENTS

CN         2153072 Y      1/1994
CN       101194198 A      6/2008
(Continued)

OTHER PUBLICATIONS

International Search Report and Written Opinion of the International Searching Authority with English translation, International Patent Application No. PCT/CN2018/076965, dated May 23, 2018, 14 pages.
(Continued)

*Primary Examiner* — Hoan C Nguyen
(74) *Attorney, Agent, or Firm* — Myers Bigel, P.A.

(57) ABSTRACT

The present disclosure relates to the technical field of liquid crystal display, and specifically discloses a liquid crystal lens and liquid crystal spectacles. The liquid crystal lens includes a first substrate and a second substrate arranged oppositely, a liquid crystal layer between the first substrate and the second substrate, and an electrode unit including a first electrode and a second electrode. At least one of the first electrode and the second electrode includes an annular electrode. The first electrode is located on a side of the first substrate facing the second substrate, and the second electrode is located on a side of the second substrate facing the first substrate. Under an effect of the first electrode and the (Continued)

second electrode, liquid crystals in the liquid crystal layer further form a Fresnel lens having an adjustable focal distance.

17 Claims, 8 Drawing Sheets

(56) References Cited

U.S. PATENT DOCUMENTS

| | | | |
|---|---|---|---|
| 2004/0108984 A1* | 6/2004 | Ogasawara | G11B 7/13927 345/87 |
| 2006/0164593 A1 | 7/2006 | Peyghambarian et al. | |
| 2007/0139777 A1 | 6/2007 | Williams et al. | |
| 2009/0002801 A1 | 1/2009 | Nakaho et al. | |
| 2010/0225834 A1 | 9/2010 | Li | |
| 2010/0245743 A1 | 9/2010 | Yokoyama | |
| 2012/0188490 A1* | 7/2012 | Zohrabyan | G02F 1/134309 349/96 |
| 2013/0286309 A1 | 10/2013 | Valley et al. | |
| 2014/0376491 A1* | 12/2014 | Li | G02B 27/017 370/329 |
| 2015/0131013 A1* | 5/2015 | Chen | G02F 1/29 349/15 |
| 2015/0346560 A1* | 12/2015 | Song | G02B 30/34 349/15 |
| 2016/0033772 A1* | 2/2016 | Han | H04N 1/6083 359/630 |
| 2016/0124233 A1* | 5/2016 | Wei | G02F 1/133753 349/126 |
| 2016/0313565 A1 | 10/2016 | Wang et al. | |
| 2017/0059482 A1* | 3/2017 | Kim | G01N 21/255 |
| 2018/0173056 A1* | 6/2018 | Lin | G02F 1/133602 |
| 2018/0237694 A1* | 8/2018 | Archambeau | G02F 1/29 |

FOREIGN PATENT DOCUMENTS

| | | |
|---|---|---|
| CN | 101334566 A | 12/2008 |
| CN | 101889240 A | 11/2010 |
| CN | 102608814 A | 7/2012 |
| CN | 202502298 U | 10/2012 |
| CN | 102902128 A | 1/2013 |
| CN | 103558724 A | 2/2014 |
| CN | 104216138 A | 12/2014 |
| CN | 206002817 U | 3/2017 |
| CN | 106773380 A | 5/2017 |
| CN | 107085316 A | 8/2017 |
| TW | 201250361 A | 12/2012 |

OTHER PUBLICATIONS

First Office Action with English translation, Chinese Patent Application No. 201710526682.3, dated Sep. 29, 2018, 25 pages.

* cited by examiner

LIQUID CRYSTAL LENS AND LIQUID CRYSTAL SPECTACLES

CROSS REFERENCE TO RELATED APPLICATIONS

The present application is a 35 U.S.C. 371 national stage application of PCT International Application No. PCT/CN2018/076965, filed on Feb. 22, 2018, which claims the benefit of Chinese patent application No. 201710526682.3, filed on Jun. 30, 2017, the contents of which are incorporated herein by reference in their entireties.

TECHNICAL FIELD

The present disclosure relates to the technical field of liquid crystal display, and specifically discloses a liquid crystal lens and liquid crystal spectacles.

BACKGROUND ART

With the development of technology, people in the modern society are staying increasingly long in front of electronic screens every day. As a result, our eyes get tired easily, and our vision becomes poorer and poorer. Many people are both myopic and astigmic. The dioptric power for myopia may vary in physical reexaminations from year to year. Moreover, as we grow older, we may also suffer from presbyopia, which requires new spectacles for vision correction. According to the current spectacle market, a spectacle frame will cost several hundred yuan or even several thousand yuan. Besides, the procedure from optometry to lens grinding and then to fetching usually takes quite a few days. During this procedure, people will have to use their old spectacles or grope their way if they do not have any. In addition, people will also have to waste time on the road, because they must try the spectacles on-site. Therefore, frequent change of spectacles not only increases our economic burdens, but also causes many inconveniences in our lives.

As technology advances, liquid crystal spectacles have already been developed. In liquid crystal spectacles, liquid crystals, driven by a voltage, change their arrangement sequence and thereby change a focal distance of the lens. Since natural light comprises randomly polarized light, a four-layered lenticular lens or a dual-layered circular lens is usually required in a liquid crystal lens. Therefore, the liquid crystal spectacles are generally made in the form of circular lenses. This results in a great cell thickness, a heavy and clumsy device, and a high requirement for the craftsmanship.

As can be seen, how to design utility spectacles that are light and thin with a simple structure is an urgent technical problem to be solved at present.

SUMMARY

According to one aspect of the present disclosure, a liquid crystal lens is provided. The liquid crystal lens comprises: a first substrate and a second substrate arranged oppositely; a liquid crystal layer between the first substrate and the second substrate; and an electrode unit comprising a first electrode and a second electrode. At least one of the first electrode and the second electrode comprises an annular electrode. The first electrode is located on a side of the first substrate facing the second substrate, and the second electrode is located on a side of the second substrate facing the first substrate. Under an effect of the first electrode and the second electrode, liquid crystals in the liquid crystal layer further form a Fresnel lens with an adjustable focal distance.

According to one implementation, the first electrode comprises a first common electrode and a first pixel electrode, wherein the first pixel electrode is an annular electrode, and the first common electrode is a planar electrode. Besides, the second electrode comprises a second common electrode and a second pixel electrode, wherein the second pixel electrode is an annular electrode, and the second common electrode is a planar electrode. In this case, the liquid crystals in the liquid crystal layer are nematic liquid crystals or smectic liquid crystals.

Optionally, the first pixel electrode comprises a plurality of first annular electrodes arranged concentrically at intervals, and distances between adjacent first annular electrodes are equal. Similarly, the second pixel electrode comprises a plurality of second annular electrodes arranged concentrically at intervals and corresponding to a respective one of the first annular electrodes, wherein distances between adjacent second annular electrodes are equal.

Optionally, the liquid crystal lens further comprises: a plurality of first annular spacers arranged at intervals on a side of the first substrate facing the second substrate; and a plurality of second annular spacers arranged at intervals on a side of the second substrate facing the first substrate. Specifically, the liquid crystals in the liquid crystal layer are configured to form a curve describing liquid crystal delays under an effect of the first electrode and the second electrode, the curve, describing liquid crystal delays, comprising a plurality of peak-valley descending segments and a plurality of valley-peak ascending segments. Besides, each of the plurality of first annular spacers and the plurality of second annular spacers is arranged at a peak-valley descending segment or a valley-peak ascending segment, so as to form a convex Fresnel lens or a concave Fresnel lens.

Optionally, the liquid crystal lens further comprises: a first alignment film arranged on a side of the first substrate proximate to the liquid crystal layer, and a second alignment film arranged on a side of the second substrate proximate to the liquid crystal layer, wherein an alignment direction of the first alignment film is perpendicular to that of the second alignment film.

According to a further implementation, the first electrode comprises a first pixel electrode, wherein the first pixel electrode is an annular electrode; and the second electrode comprises a second common electrode, wherein the second common electrode is a planar electrode. In this case, the liquid crystals in the liquid crystal layer are blue phase liquid crystals.

Optionally, the first pixel electrode comprises a plurality of first annular electrodes arranged concentrically at intervals, and distances between adjacent first annular electrodes are equal.

Optionally, the liquid crystal lens further comprises: a plurality of annular spacers arranged at intervals on a side of the first substrate facing the second substrate. Specifically, the liquid crystals in the liquid crystal layer are configured to form a curve describing liquid crystal delays under an effect of the first electrode and the second electrode, the curve, describing liquid crystal delays, comprising a plurality of peak-valley descending segments and a plurality of valley-peak ascending segments. Besides, each of the annular spacers is arranged at a peak-valley descending segment or a valley-peak ascending segment, so as to form a convex Fresnel lens or a concave Fresnel lens.

Optionally, the first annular electrodes are circular or elliptic.

Optionally, the first substrate comprises a first base plate, and the second substrate comprises a second base plate, wherein the first base plate and the second base plate are transparent flexible base plates.

Optionally, the liquid crystal lens further comprises: an electrochromic layer and a third electrode arranged sequentially on a side of the second substrate facing away from the liquid crystal layer, wherein the electrochromic layer is configured to form an emotion pattern when a voltage is applied to the third electrode.

Optionally, the third electrode comprises a plurality of block sub-electrodes arranged in an array.

Optionally, the electrochromic layer comprises a tungsten trioxide layer and an electrolyte layer.

According to another aspect of the present disclosure, a type of liquid crystal spectacles is further provided, comprising the liquid crystal lens as described in any of the above embodiments.

Optionally, the liquid crystal spectacles further comprise a sensor unit and a controller. The sensor unit comprises a plurality of distance sensors, wherein each of the distance sensors is connected with the controller, and configured for detecting a distance between the distance sensor and human eyes and transmitting the distance to the controller. Besides, the controller is configured for calculating a focal distance of human eyes based on the distance, and calculating voltages to be provided to the first electrode and the second electrode based on the focal distance of human eyes, thereby adjusting a focal distance of the Fresnel lens.

Optionally, the liquid crystal spectacles further comprise a detector. The detector is configured for detecting a physiological state of human body and feeding it back to the controller. The controller controls the liquid crystal lens to display an emotion pattern corresponding to the physiological state based on the physiological state fed back by the detector.

DETAILED DESCRIPTION OF EMBODIMENTS

In order to help those skilled in the art to better understand technical solutions of the present disclosure, the liquid crystal lens and the liquid crystal spectacles as provided in the present disclosure will be further described in detail with reference to the drawings and the specific embodiments.

For ordinary spectacles, a user is generally required to change different spectacles upon different applications. For example, a myopic user has to wear myopic spectacles, while a presbyopic user may have to wear presbyopic spectacles. However, the existing liquid crystal lenses are usually thick and heavy. To this end, the present application provides a liquid crystal lens equivalent to a Fresnel lens, and corresponding liquid crystal spectacles. The liquid crystal lens comprises an electrode unit and a liquid crystal layer, wherein liquid crystals in the liquid crystal layer form a Fresnel lens with an adjustable focal distance under an effect of the electrode unit. Accordingly, the focal distance of the spectacles can be adjusted flexibly upon needs, and thus a pair of spectacles that is permanently wearable can be obtained.

According to an embodiment of the present disclosure, a liquid crystal lens equivalent functionally to a Fresnel lens is provided. Accordingly, the focal distance of the spectacles can be adjusted flexibly upon needs, and thus a pair of spectacles that is permanently wearable can be obtained.

Figure 1:
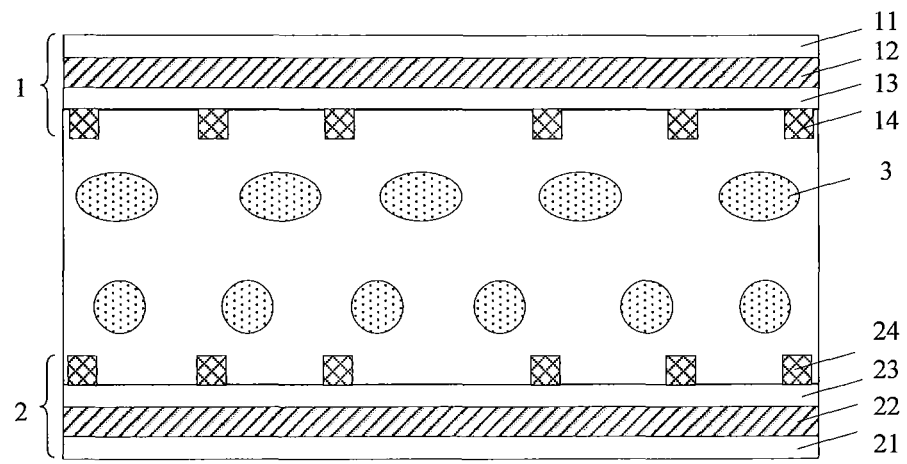
FIG. 1 is a section view of a liquid crystal lens according to an embodiment of the present disclosure.

FIG. 1 is a section view of a liquid crystal lens according to an embodiment of the present disclosure. As shown in FIG. 1, the crystal lens comprises: a first substrate 1 and a second substrate 2 arranged oppositely, a liquid crystal layer 3 arranged between the first substrate 1 and the second substrate 2, and an electrode unit. The electrode unit comprises a first electrode and a second electrode, wherein at least one of the first electrode and the second electrode comprises an annular electrode. Specifically, as shown in FIG. 1, the first electrode is located on a side of the first substrate 1 facing the second substrate, and the second electrode is located on a side of the second substrate facing the first substrate 1. In both the first substrate 1 and the second substrate 2, an annular pixel electrode and a planar common electrode are used.

In FIG. 1, the first electrode comprises a first common electrode 12 and a first pixel electrode 14, wherein a first insulating layer 13 is further arranged between the first common electrode 12 and the first pixel electrode 14. As an example, the first pixel electrode 14 is an annular electrode, and the first common electrode 12 is a planar electrode. Accordingly, a first electric field generated by the first pixel electrode 14 and the first common electrode 12 is a horizontal electric field. Similarly, the second electrode comprises a second common electrode 22 and a second pixel electrode 24, wherein a second insulating layer 13 is further arranged between the second common electrode 22 and the second pixel electrode 24. As an example, the second pixel electrode 24 is an annular electrode, and the second common electrode 22 is a planar electrode. In view of above, a second electric field generated by the second pixel electrode 24 and the second common electrode 22 is a horizontal electric field. In this case, the liquid crystals in the liquid crystal layer 3 are nematic liquid crystals or smectic liquid crystals.

Figure 2:
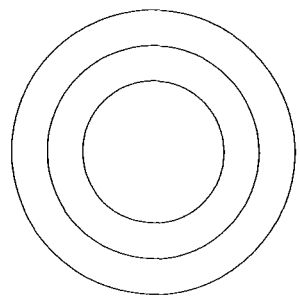
FIG. 2 is a plan view of an annular electrode in the liquid crystal lens of FIG. 1.

As shown in FIG. 2, the annular electrode comprises a plurality of annular electrodes arranged concentrically. That is, the first pixel electrode 14 comprises a plurality of first annular electrodes arranged concentrically at intervals, and distances between adjacent first annular electrodes are equal. Similarly, the second pixel electrode 24 comprises a plurality of second annular electrodes arranged concentrically at intervals and corresponding respectively to the first annular electrodes, wherein distances between adjacent second annular electrodes are equal. In such an embodiment, the first pixel electrode 14 and the second pixel electrode 24 both take the form of annular electrodes arranged concentrically, which facilitates distribution of the liquid crystals.

Further optionally, the first annular electrode and the second annular electrode are circular or elliptic.

Optionally, the first substrate 1 further comprises a plurality of first thin film transistors, wherein an output electrode of each first thin film transistor is connected with one of the first annular electrodes. Similarly, the second substrate can further comprise a plurality of second thin film transistors, wherein an output electrode of each second thin film transistor is connected with one of the second annular electrodes. In this case, the thin film transistor serves as a control element for controlling liquid crystal deviations in the first substrate 1 and the second substrate, such that the liquid crystals are deflected under an effect of the electric field and thus the direction of light can be controlled.

Generally, an alignment film is required in order to provide the liquid crystal molecules with an initial orientation. In the liquid crystal lens according to the current embodiment, the first substrate 1 further comprises a first alignment film arranged proximate to the liquid crystal layer 3; and in the meanwhile, the second substrate further comprises a second alignment film arranged proximate to the liquid crystal layer 3, wherein an alignment direction of the first alignment film is perpendicular to that of the second alignment film. For example, in the current embodiment, the liquid crystal lens (specifically, the first and second alignment films) can be arranged such that the liquid crystals are orientated vertically in a position close to the second substrate 2; and in the meanwhile, the liquid crystals are oriented horizontally in a position close to the first substrate 1. That is, initially, the liquid crystals are perpendicularly oriented in the vicinity of the upper and lower substrates. In other words, liquid crystal molecules in the liquid crystal layer 3 close to the first substrate 1 are oriented in parallel to the plane of paper, and liquid crystal molecules in the liquid crystal layer 3 close to the second substrate 2 are oriented perpendicularly to the plane of paper. In the liquid crystal lens according to the current embodiment, the liquid crystal layer 3 is a mono-layered liquid crystal cell. However, since alignment directions of the first alignment film and the second alignment film are perpendicular to each other, initially, the liquid crystals in the upper portion and the lower portion of the entire liquid crystal layer will be oriented in different forms, i.e., perpendicularly to each other. This helps to ensure successful transmission of natural light (including two polarization directions perpendicular to each other at the same time) with no voltage applied. Besides, it should be further pointed out that in an occasion where liquid crystal spectacles are applied, fixed arrangement of the first electrode and the second electrode with respect to human eyes is not required. In contrast, either the first electrode or the second electrode can be arranged closer to human eyes, wherein their positions can be exchanged.

In view of the above structure, in the liquid crystal lens according to the current embodiment, the liquid crystals are controlled by the electrode unit to form an equivalent Fresnel lens. Accordingly, the original cell thickness can be reduced, and a light and thin device can be facilitated. In addition, such a liquid crystal lens is more practical, and the manufacture process thereof is much easier. In this way, spectacles with different modes (e.g., different focal distances) can be provided according to the vision of human eyes, and thus a pair of spectacles that is permanently wearable can be obtained.

As an example, the first substrate 1 comprises a first base plate 11, and the second substrate comprises a second base plate, wherein the first base plate 11 and the second base plate 21 are transparent flexible base plates. A flexible base plate structure is more adapted to human eyes.

Figure 3:
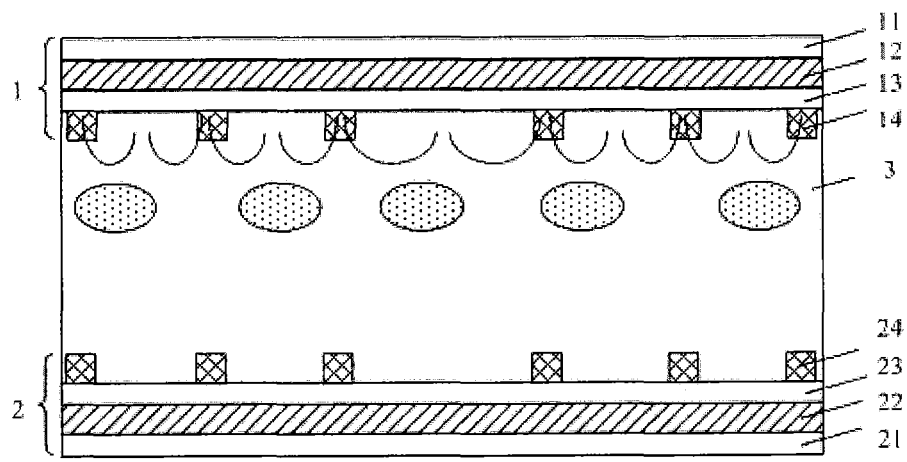
FIG. 3 is a section view of a horizontal electric field as generated in the vicinity of a first substrate in the liquid crystal lens of FIG. 1.
Figure 4:
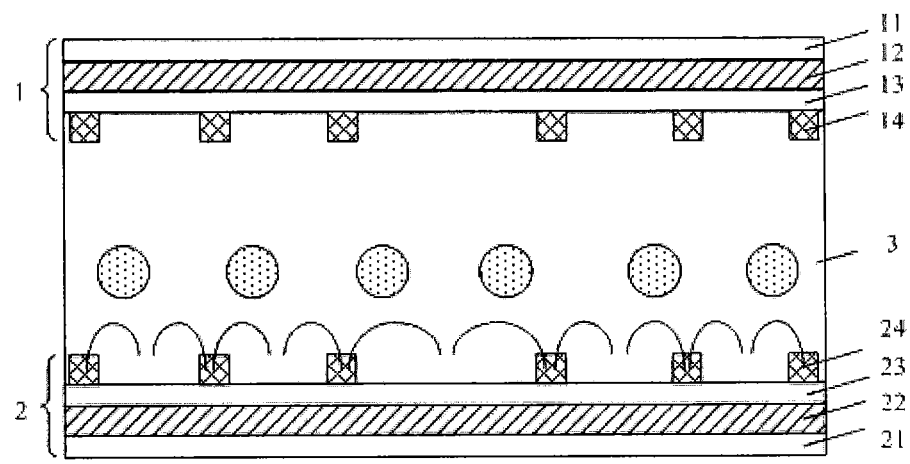
FIG. 4 is a section view of a horizontal electric field as generated in the vicinity of a second substrate in the liquid crystal lens of FIG. 1.

FIG. 3 is a section view of the liquid crystal lens when a horizontal electric field is generated in the vicinity of the upper first substrate 1. Specifically, due to the presence of first alignment film, the alignment direction of the liquid crystal molecules is initially perpendicular to the plane of paper. However, under an effect of the first electric field, part of the liquid crystals in the liquid crystal layer 3 close to the first substrate will be deflected in the plane, and thus oriented in parallel to the first electric field. Similarly, FIG. 4 is a section view of the liquid crystal lens when a horizontal electric field is generated in the vicinity of the lower second substrate. Specifically, due to the presence of second alignment film, the alignment direction of the liquid crystal molecules is initially parallel to the plane of paper. However, under an effect of the second electric field, part of the liquid crystals in the liquid crystal layer 3 close to the second substrate will be deflected in the plane, and finally oriented in parallel to the second electric field. Besides, in consideration of similar arrangements of the first pixel electrode 14 and the second pixel electrode 24, as well as the two common electrodes 12 and 22 that are both planar electrodes, electric field directions of the first electric field and the second electric field will be substantially identical. As can be seen, under an effect of the first electric field and the second electric field, the alignment directions of liquid crystals in the upper portion and the lower portion of a mono-layered liquid crystal cell will be changed, and specifically, deflected respectively from the original orientations perpendicular to each other, wherein the specific deflection angle will be determined by the two electric fields (i.e., the first electric field and the second electric field). Accordingly, two liquid crystal lenses are formed respectively in the upper portion and the lower portion of the mono-layered liquid crystal cell, so as to modulate the natural light (including two polarization directions perpendicular to each other at the same time) completely. It should be pointed out that in FIGS. 3-4, general directions of the electric fields generated by the electrode unit are indicated schematically by curves respectively. Apparently, those skilled in the art should understand that such schematic indications only represent examples, and do not limit the actually generated electric fields in any possible way.

Figure 5:
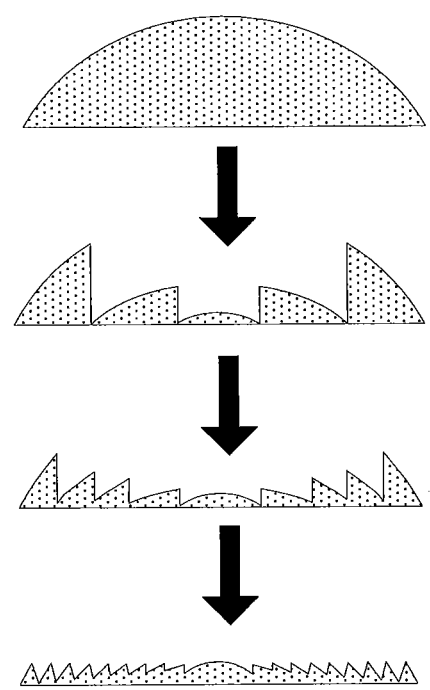
FIG. 5 is a schematic view illustrating the equivalent principle of a Fresnel lens according to an embodiment of the present disclosure.

The existing spectacles are usually made by single lens. Since the size of an ordinary lens is about 5 cm, the cell as formed will have a large thickness, which leads to a heavy device and a difficult process. However, in contrast, with reference to FIG. 5, a schematic view illustrating the equivalent principle of a Fresnel lens in the liquid crystal lens according to the current embodiment is shown. Specifically, in the Fresnel structure, the curved surface of a single lens is cut into a series of small curved surfaces, but the original curvature remains unchanged. As a result, the cell thickness is reduced. Since the Fresnel lens can reduce the liquid crystal cell thickness effectively, the device can be thinned, and the requirement for processing is relatively low.

Figure 6:
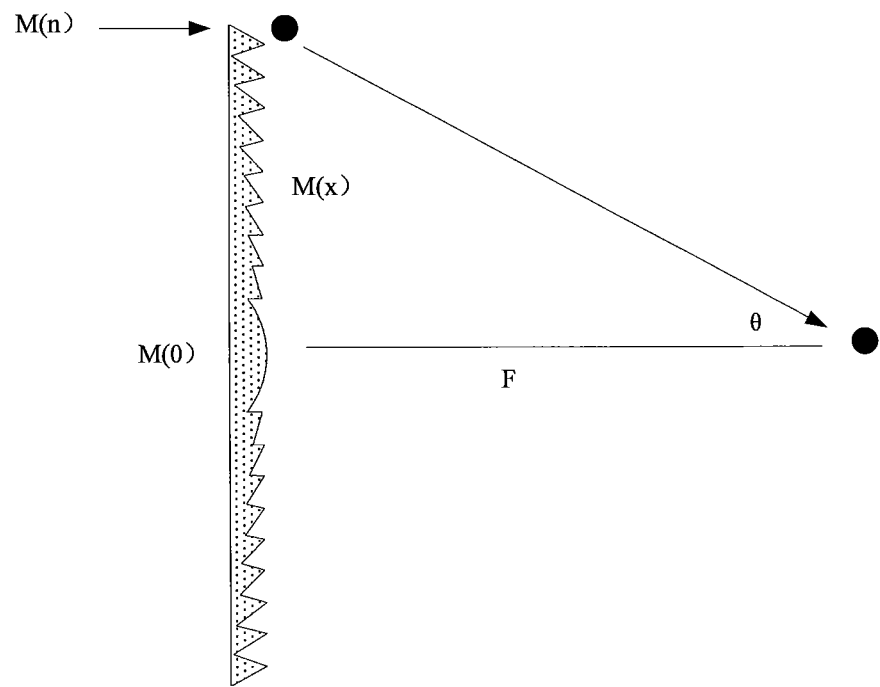
FIG. 6 is a view explaining the calculation of a Fresnel lens according to an embodiment of the present disclosure.

For example, if human eyes are hyperopic of 6 diopters, the dioptric power will be 6. In this case, the desired focal distance of the lens will be $\frac{1}{6}$=167 mm. With reference to FIG. 6, a view explaining the calculation of an equivalent Fresnel lens is shown. In this case, a line passing through the focus point of the lens and perpendicular to the Fresnel lens is taken as a central axis, and a position corresponding thereto is marked as M(0), then a distance from the nth curved surface to the central position M(0) is marked as M(n), wherein n is a positive integer. Now, if the total size of the lens is selected as P, the distance M(x) from the xth curved surface to the central position M(0) is:

$$M(x) = \frac{P*x}{n}(x = 0 - n),$$ Formula (1)

and a deflection angle θ in a focal position corresponding to M(x) is:

$$\theta(x) = \tan^{-1}\frac{M(x)}{F}.$$ Formula (2)

Figure 7:
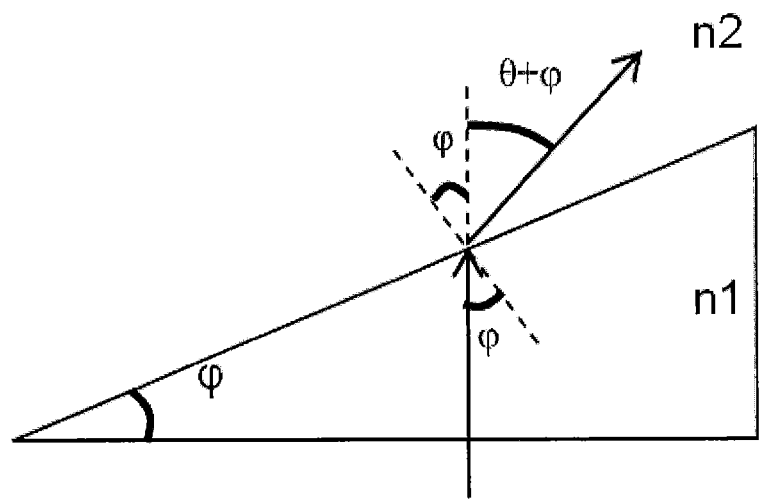
FIG. 7 is a schematic view illustrating the refraction calculation of a Fresnel lens according to an embodiment of the present disclosure.

A slope angle φ of the nth curved surface in the Fresnel lens can be calculated from the deflection angle θ. Specifically, with reference to FIG. 7, if the selected incident angle is φ (the incident angle here is viewed from the direction of eyes) and the emergent angle is φ (φ+θ), then sin(φ)*n1=sin(φ+θ)*n2 Formula (3), wherein n1 is the refractive index of the liquid crystal lens and n2 is the refractive index of air.

Optionally, the liquid crystal lens further comprises spacers 5, 5', for example, a spacer 5 (also referred to as a first spacer) formed on an upper side of the first substrate, and a spacer 5' (also referred to as a second spacer) formed on a lower side of the first substrate. Specifically, a plurality of spacers 5, 5' are arranged at intervals in the shape of a ring, and each spacer 5, 5' corresponds to a peak-valley descending segment or a valley-peak ascending segment of a curve describing liquid crystal delays as formed by the liquid crystals in the liquid crystal layer under an effect of the electric fields generated by the electrode unit. In this case, a convex Fresnel lens or a concave Fresnel lens can be formed. In applications, a delay curve of liquid crystals under an effect of electric fields can be simulated according to the position where the electrodes are arranged and the properties of liquid crystals as adopted. Thereby, the curve describing liquid crystal delays is corrected by arranging spacers 5, 5', and perpendicular curve changes equivalent to a concave lens or a convex lens and different types of lens model are obtained.

Figure 8A:
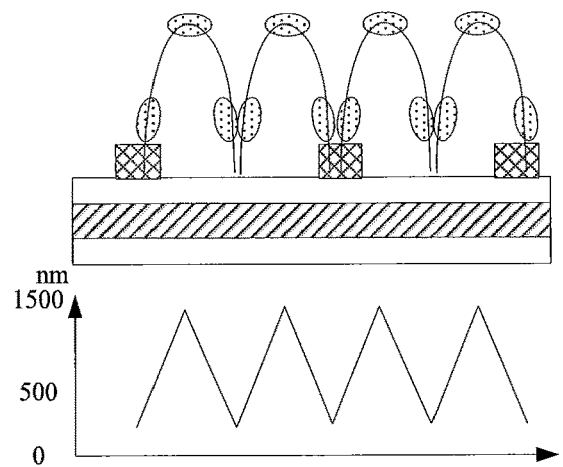
FIGS. 8A and 8B are schematic views showing a curve, describing liquid crystal delays, of the liquid crystal lens according to an embodiment of the present disclosure.
Figure 9:
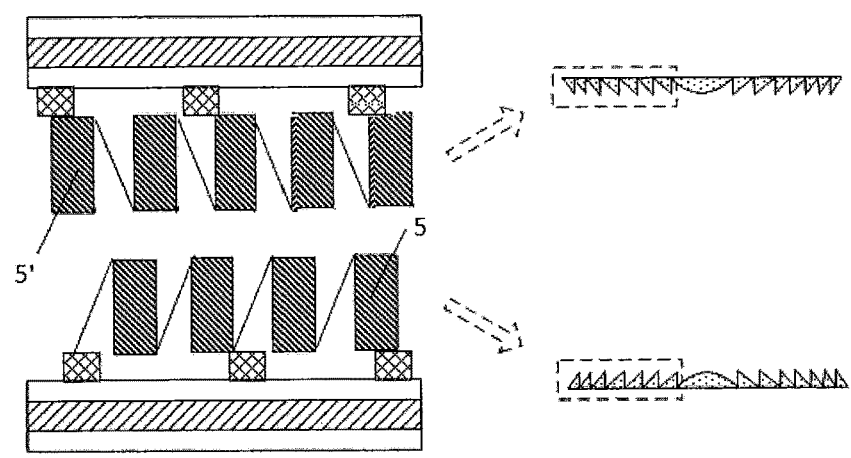
FIG. 9 is a schematic view of spacers arranged correspondingly to the liquid crystal delays of the liquid crystal lens in FIG. 8A.

To take the second substrate and the spacer 5 formed thereon as an example. After the slope angle of the nth curved surface is determined, a voltage desired by the second pixel electrode 24 is simulated via software. Now, the horizontal electric field drives the liquid crystals to deflect, and the liquid crystals are deflected as shown in the upper part of FIG. 8A and a liquid curve describing crystal delays is formed as shown in the lower part of FIG. 8A (wherein the horizontal ordinates indicate positions, and the vertical ordinates indicate amplitudes of the liquid crystal delays). If it is desired to achieve a left half of a convex Fresnel lens, the curve describing liquid crystal delays is to be corrected such that the left oblique portion of the curve describing liquid crystal delays is retained and the other portion is changed perpendicularly. That is, with the spacer 5 as shown in the lower part of FIG. 9, the right oblique portion is occluded by the spacer 5 and the left oblique portion is retained. In this way, the delay curve is changed perpendicularly, and finally, the left half of the convex Fresnel lens as indicated by the dashed line in the upper part of FIG. 9 is obtained. As can be easily deduced, for processing of the right half of the lens, the left oblique portion should be occluded by means of the spacer 5, and the right oblique portion should be retained. Thereby, an overall convex Fresnel lens is achieved, which matches with the lens model required by the eyes.

In a similar way, for the upper substrate and the spacer 5' formed thereon, a convex Fresnel lens can also be achieved correspondingly, which matches with the lens model required by the eyes. In this case, it should be pointed out that although the spacers 5, 5' formed on the two substrates are shown as transversally staggered by each other in FIG. 9, this does not limit the present disclosure in any possible way. In fact, having benefited from teachings of the present disclosure, those skilled in the art should be able to conceive of positions of the spacers 5, 5' on respective substrates based on the corresponding delay curve, and in this aspect, the present disclosure is not limited by the drawings or the specific depictions in the description.

As for the design of a concave lens model, it can be completed in a similar way with reference to the convex lens model, and thereby an overall concave Fresnel lens is achieved, which matches with the lens model required by the eyes. Obviously, the examples are given in the form of section views in both FIGS. 8A and 8B, so depictions in two-dimensional space are adopted. In fact, due to the presence of annular electrodes, the spacer 5 has an annular structure arranged at intervals, and corresponds to a respective peak-valley descending segment or valley-peak ascending segment of the curve describing liquid crystal delays.

Figure 8B:
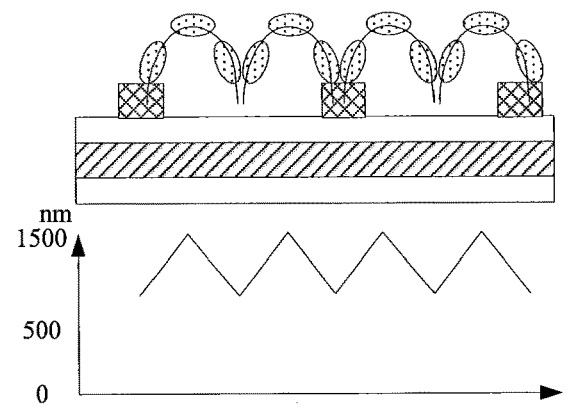

Likewise, the adjustment of different diopters will be explained by taking FIGS. 8A and 8B as examples. FIG. 8A represents high-diopter spectacles, where a higher voltage (e.g., 10V) is needed to drive the liquid crystals, so as to obtain a greater delay difference (1400 nm) that corresponds to a larger inclination angle (slope angle) of the lens. On the contrary, FIG. 8B represents low-diopter spectacles, where a lower voltage (e.g., 5V) is needed to drive the liquid crystals, so as to obtain a smaller delay difference (400 nm) that corresponds to a smaller inclination angle (slope angle) of the lens.

The liquid crystal lens according to the current embodiment can achieve a dual-layered Fresnel liquid crystal lens by means of mono-layered liquid crystal cells, and it is especially suitable for fabricating liquid crystal spectacles. In particular, since the electric field is adjustable, it can be varied with respect to different visions of human eyes. In this way, various vision problems such as myopia, hyperopia, astigmia and presbyopia are solved, and a kind of spectacles that is permanently wearable are provided, which helps people get rid of the trouble of changing spectacles.

According to another embodiment of the present disclosure, a liquid crystal lens that is equivalent to a Fresnel lens is provided, which can flexibly adjust the focal distance of spectacles upon needs, and thus help to obtain a pair of spectacles that is permanently wearable.

Figure 10:
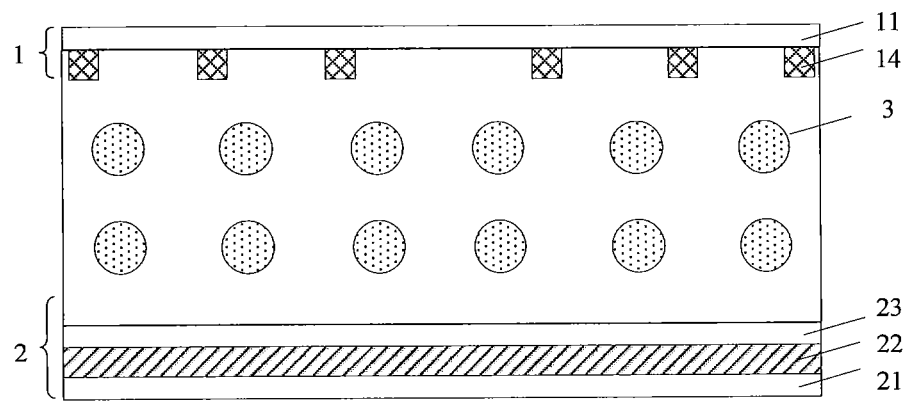
FIG. 10 is a section view of a liquid crystal lens according to another embodiment of the present disclosure.

As shown in FIG. 10, a section view of a liquid crystal lens according to another embodiment of the present disclosure is shown. Specifically, the first electrode comprises a first pixel electrode 14, wherein the first pixel electrode 14 is an annular electrode. The second electrode comprises a second common electrode 22, wherein the second common electrode 22 is a planar electrode. In this case, the electric field generated by the first pixel electrode 14 and the second common electrode 22 is a vertical electric field, and the liquid crystals in the liquid crystal layer 3 are blue phase liquid crystals.

Figure 11A:
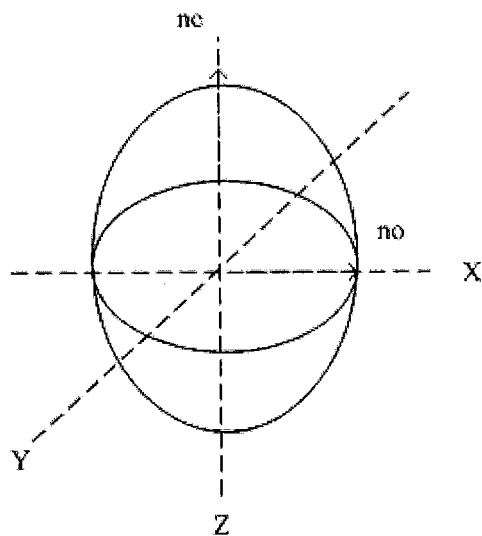
FIG. 11A is a schematic view illustrating the optical refractive index of blue phase liquid crystals according to another embodiment of the present disclosure.
Figure 11B:
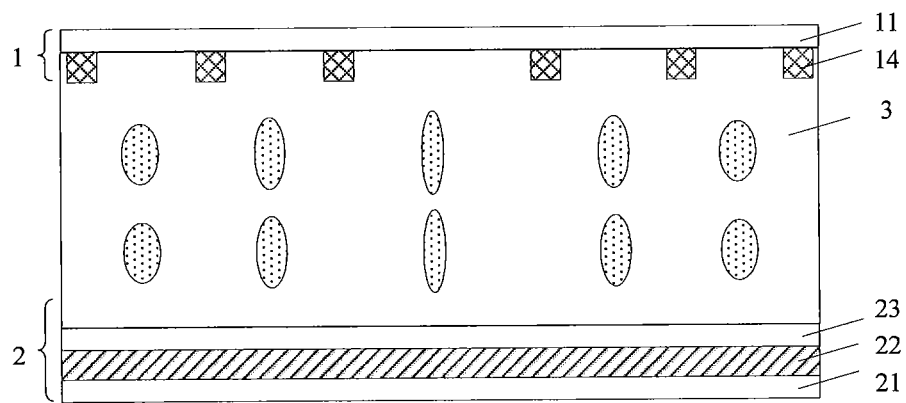
FIG. 11B is a schematic view of the liquid crystal lens under an effect of an electric field according to another embodiment of the present disclosure.

One of the prominent characteristics of blue phase liquid crystals is optical isotropy in a dark state. With reference to FIG. 11A, characteristics of the refractive index of blue phase liquid crystals are shown. When incident light enters the blue phase liquid crystals vertically upwards, the plane of polarization state is perpendicular to the propagation direction of light, and thus the polarization state is coincident with the no-plane. In the no-plane, no matter what kind of direction the polarization state has, its refractive index in the no-plane equals to no. As can be seen, when light is incident in such a direction, the liquid crystal lens as formed by blue phase liquid crystals will be independent of the polarization state of incident light. FIG. 11B shows variations of the blue phase liquid crystals with electrode distribution under the effect of electric fields, wherein the closer it is to the central annular electrode, the greater tensile deformation of the liquid crystals will be.

In the liquid crystal lens according to the current embodiment, the first pixel electrode 14 comprises a plurality of first annular electrodes arranged concentrically at intervals, wherein distances between adjacent first annular electrodes are equal. The first pixel electrode 14 takes the form of annular electrodes arranged concentrically so as to control the distribution of liquid crystals.

Optionally, the first substrate 1 further comprises a plurality of first thin film transistors, wherein an output electrode of each first thin film transistor is connected with one of the first annular electrodes. The thin film transistor serves as a control element for controlling liquid crystal deviations in the first substrate 1, such that the liquid crystals are deflected under an effect of the electric fields and thus the direction of light can be controlled.

In the current embodiment, the liquid crystal lens is formed by blue phase liquid crystals, and thus a complete modulation of natural light is achieved. Besides, it also avoids the use of multi-layered liquid crystal cells, which makes the device to be lighter and thinner. The principle for forming an equivalent Fresnel lens by the liquid crystal lens is the same as the principle for forming an equivalent Fresnel lens by the liquid crystal lens in embodiment 1, and in the meanwhile, FIG. 5 can be referred to, which will not be repeated here for simplicity.

During the operation of liquid crystal lens according to the current embodiment, under the effect of a perpendicular electric field with gradients, the refractive index will be varied in a way as similar to a lens. Besides, the liquid crystal lens can also be adapted to light with any polarization state, such that the liquid crystal lens no longer depends on the polarization state of incident light. In a liquid crystal lens unit, if the liquid crystals form a convex lens, the voltage in a middle position will be lower while the voltage in both ends will be higher. In this case, under the effect of the electric fields, the blue phase liquid crystals will cause a Kerr effect, as shown in Formula (4):

$$\Delta n = \lambda K E^2 \qquad \text{Formula (4)},$$

wherein λ is wavelength, K is Kerr coefficient, and E is electric field intensity. As can be seen, the higher the electric field intensity is, the greater the resulted birefringence Δn will be.

Further optionally, the first annular electrodes are circular or elliptic.

In the liquid crystal lens according to the current embodiment, a concentric circle structure of a Fresnel lens is formed by blue phase liquid crystals under the effect of a vertical electric field, which is especially suitable for fabricating mono-layered liquid crystal spectacles. In particular, since the magnitude of electric field is adjustable, it can be adapted to different vision changes of human eyes. In this way, various vision problems such as myopia, hyperopia, astigmia and presbyopia are solved, and a kind of spectacles that is permanently wearable are provided, which helps people get rid of the trouble of changing spectacles.

As similar to the liquid crystal lens in the former embodiment, in the current embodiment, the liquid crystal lens can effectively reduce the cell thickness of liquid crystal and make the device to be thin. Therefore, it is more practical, and the processing is simpler.

According to another embodiment of the present disclosure, liquid crystal spectacles are further provided. The liquid crystal spectacles comprise the liquid crystal lens as described in any of the above embodiments. Since the focal distance of the spectacles can be flexibly adjusted upon needs, the liquid crystal spectacles can be worn permanently and adapted to applications in different scenes.

Figure 12:
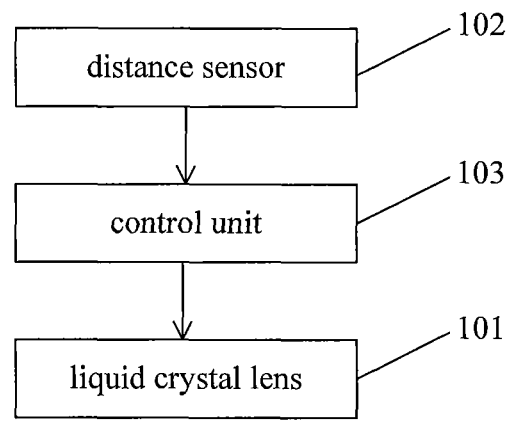
FIG. 12 is a structure diagram of liquid crystal spectacles according to yet another embodiment of the present disclosure.

When the liquid crystal spectacles are formed, the plane of substrate in the liquid crystal lens is the same as that of spectacles. As shown in FIG. 12, in addition to a liquid crystal lens 101, the liquid crystal spectacles further comprise a sensor unit 102 and a controller 103. Specifically, the sensor unit 102 comprises a plurality of distance sensors, wherein each of the distance sensors is connected with the controller 103, and configured for detecting a distance between the distance sensor and human eyes and transmitting the distance to the controller 103. Besides, the controller 103 is configured for calculating a focal distance of human eyes based on the distance between the sensor unit 102 and human eyes, and further calculating voltages to be provided to the electrode unit based on the focal distance of human eyes, thereby adjusting a focal distance of the Fresnel lens. By arranging the distance sensors and the controller 103, automatic measurement of distance can be achieved, and different voltages can be applied to the electrodes upon different applications.

Thus, the liquid crystal lens 101 will match with the vision condition of a patient. To take an ordinary myopic case as an example, the liquid crystal lens 101 will achieve the effect of a concave lens. In contrast, in the case of hyperopia, the liquid crystal lens 101 will from a convex lens. In the above two cases, different electrode voltages should be adjusted with respect to different dioptric powers, such that the liquid crystal lens produces different curvatures. Furthermore, if the dioptric power of the user's spectacles changes, it is only required for performing optometry with respect to the new dioptric power and thereby adjusting the voltage of liquid crystal spectacles.

Figure 13A:
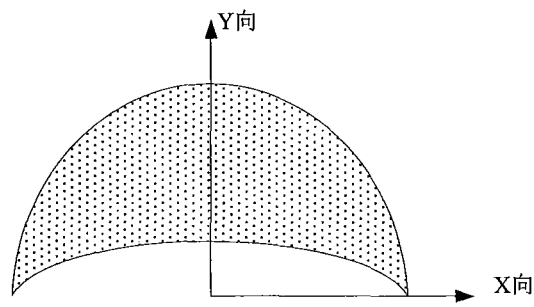
FIGS. 13A and 13B are respectively schematic views illustrating adjustment of the liquid crystal spectacles with respect to different dioptric powers for astigmia according to yet another embodiment of the present disclosure.
Figure 13B:
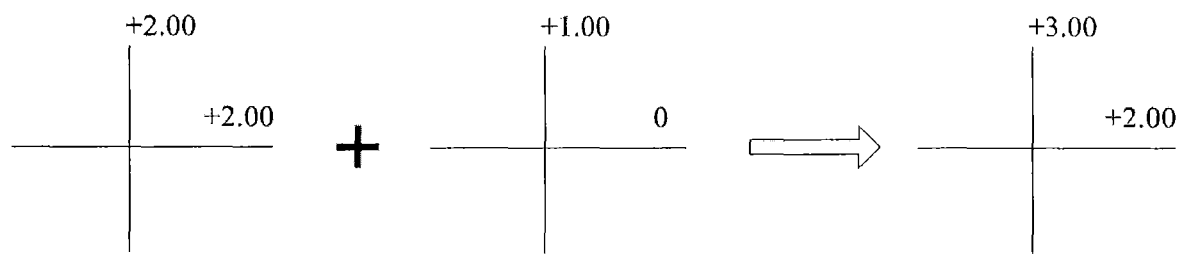

Besides, apart from myopia and hyperopia, human eyes may also suffer from astigmia. Essentially, astigmia is a phenomenon where focal positions in two perpendicular directions in the lens plane are different. In this case, we cannot simply use a circular lens, but instead have to additionally correct the curvature of lens. In the case of astigmia, the liquid crystal lens 101 can form an annular curved surface lens. As an example, the lenticular lens or the annular curved surface lens as shown in FIG. 13A can be used for correcting astigmia. When a patient suffers from astigmia, the hyperopic or myopic spectacles can be further adjusted based on the astigmic condition of the patient. For example, assuming that human eyes are hyperopic of 2 diopters and astigmic of 1 diopter, as shown in FIG. 13B, it is only necessary to add 1 diopter to the dioptric power of the spectacles in one direction.

When we get old, our eye balls will be less elastic, and then cannot adjust themselves to achieve focusing. In this case, multi-focus spectacles are needed for the adjustment. Specifically, by suitably adjusting the voltage of electrode, the focal distance of lens can be varied, so as to satisfy the need of patient in different ages. Then, a sensor can be used for measuring the distance between human eyes and the sensor in real time, and converting it into a focal distance of human eyes so as to realize a real-time adjustment.

With the development of science and technology, the functions of spectacles are becoming more and more diversified. For example, from ordinary vision correction to outdoor eye protection (e.g., sunglasses) and to Google glasses, entertainment and versatility of spectacles are achieved. In yet another embodiment of the present disclosure, a liquid crystal lens is further provided, which also adds a new function of emotion expression to the equivalent Fresnel lens as formed. Thereby, on a pair of spectacles that is permanently wearable, emotion expression or entertainment effects can be also provided.

Figure 14:
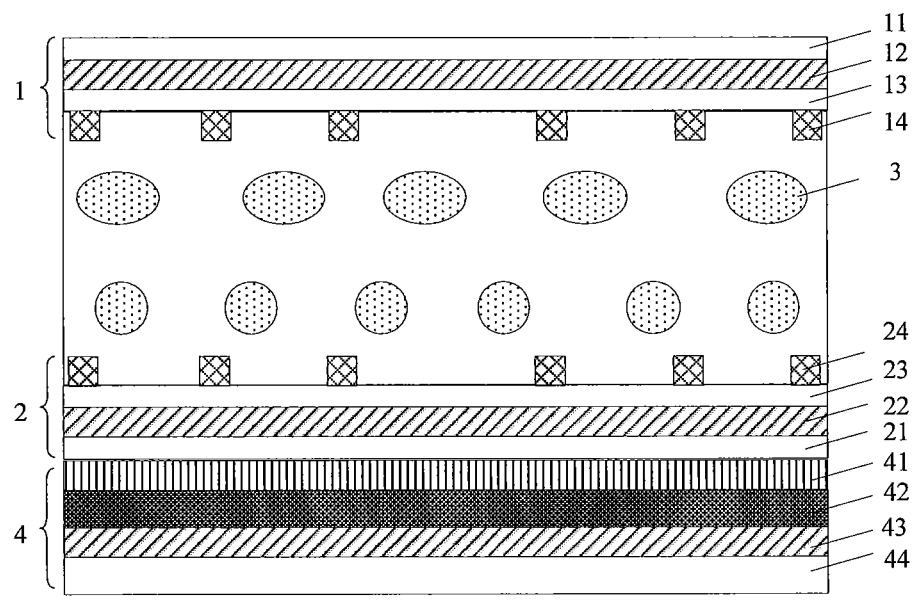
FIGS. 14 and 15 are respectively section views of the liquid crystal lens according to yet another embodiment of the present disclosure.
Figure 15:
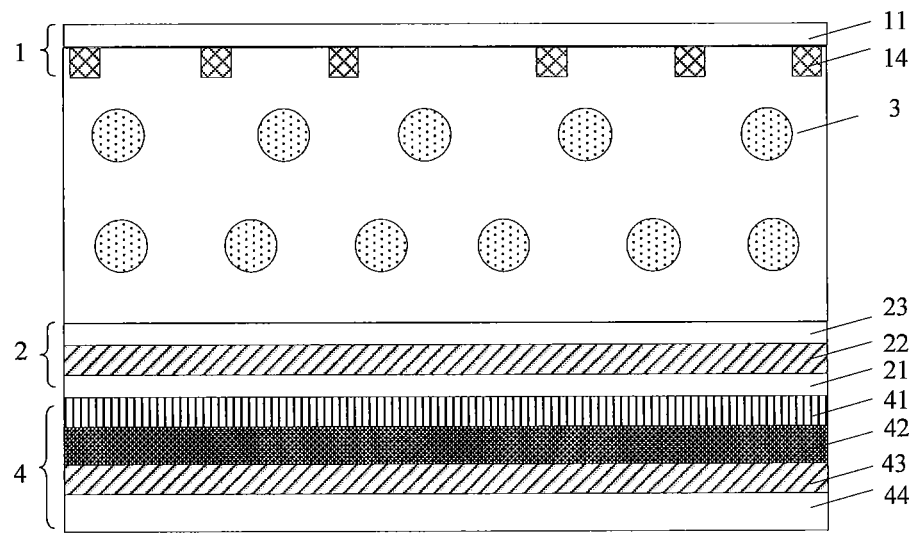

As shown in FIGS. 14-15, based on the liquid crystal lens as shown in FIG. 1 or 10, an electrochromic layer 42, an electrolyte layer 41 and a third electrode 43 can be arranged sequentially on a side of the second substrate facing away from the liquid crystal layer 3. Specifically, a third electric field is generated via the third electrode 43 and the second common electrode 22, which third electric field being a vertical electric field. Now, the electrochromic layer 42 can form an emotion pattern by means of the third electric field. As can be easily understood by those skilled in the art, electrochromism refers to a phenomenon where an optical property (e.g., reflectivity, transmittance, absorptivity and so on) of a material changes stably and reversibly under the effect of an external electric field. Such changes are embodied by reversible changes in color and transparency in appearance. Materials having electrochromic characteristics can be called electrochromic materials. In embodiments of the present disclosure, according to properties of the electrochromic materials, emotion patterns of different colors or shapes can be formed, so as to provide emotion expression or entertainment effects.

For example, in FIG. 15, the first pixel electrode 14 in the first substrate 1 is an annular electrode, and the second common electrode 22 in the second substrate 2 is a planar electrode, wherein a vertical electric field is generated via the electrodes in the first substrate 1 and the second substrate 2, so as to control the liquid crystal layer 3. Besides, the second common electrode 22 in the second substrate is shared by the liquid crystal layer 3 and the electrochromic layer 42, wherein a vertical electric field is generated via the second substrate 2 and a third substrate 4, so as to control the electrochromic material.

Figure 16:
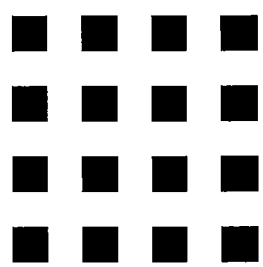
FIG. 16 is a plan view of a third electrode in the liquid crystal lens according to yet another embodiment of the present disclosure.
Figure 17:
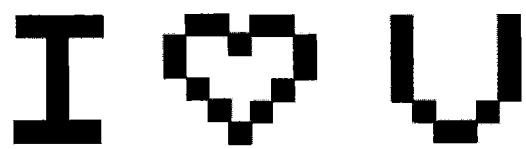
FIG. 17 is a schematic view of an emotion pattern in the liquid crystal lens according to yet another embodiment of the present disclosure.

Optionally, in the liquid crystal lens according to the current embodiment, sub-electrodes in the form of an array or a pattern can be used. With arrayed sub-electrodes, more diversified patterns can be shown. Moreover, if the arrayed sub-electrodes are designed to have a micron-scaled size and comprise electrochromic materials matching with three colors, more colors will be obtained by a mixture of them, and thus the displayed patterns will be richer. As shown in FIG. 16, the third electrode 43 comprises a plurality of block sub-electrodes arranged in an array. In this case, ions in the electrolyte layer 41 are injected into or extracted from the electrochromic layer 42 under the control of the third electric field. In regions corresponding to different sub-electrodes, the electrochromic layer 42 will form different colors or patterns, and finally form a matching emotion pattern, e.g., a pattern as shown in FIG. 17.

In the meanwhile, the electrochromic material in the electrochromic layer 42 comprises optionally tungsten trioxide $WO_3$. When a voltage (about 5-10V) is applied, metal cations in the electrolyte layer 41 are injected into the tungsten trioxide material, such that the electrochromic material turns to be blue. On the contrary, when no voltage is applied, the metal cations in the electrolyte layer 41 will be extracted from the tungsten trioxide material, such that the electrochromic material turns to be colorless and transparent. As can be seen, by controlling the third electric field generated by the second common electrode 22 and the third electrode 43, different patterns can be formed by means of the electrochromic layer 42.

Likewise, in the liquid crystal lens according to the current embodiment, a third base plate 44 can be a transparent flexible base plate, so as to adapt to human eyes.

In the liquid crystal lens according to the current embodiment, respective images can be displayed on the liquid crystal lens according to the information captured by human eyes. For example, when people see things that they like, information expressing delight can be sent out. Accordingly, liquid crystal spectacles comprising the liquid crystal lens can further serve as an entertainment product.

According to other embodiments of the present disclosure, liquid crystal spectacles are further provided. The liquid crystal spectacles comprise the liquid crystal lens as described in any of the above embodiments. Since the focal distance of the spectacles can be flexibly adjusted upon needs, the liquid crystal spectacles can be worn permanently and adapted to applications in different scenes.

Figure 19:
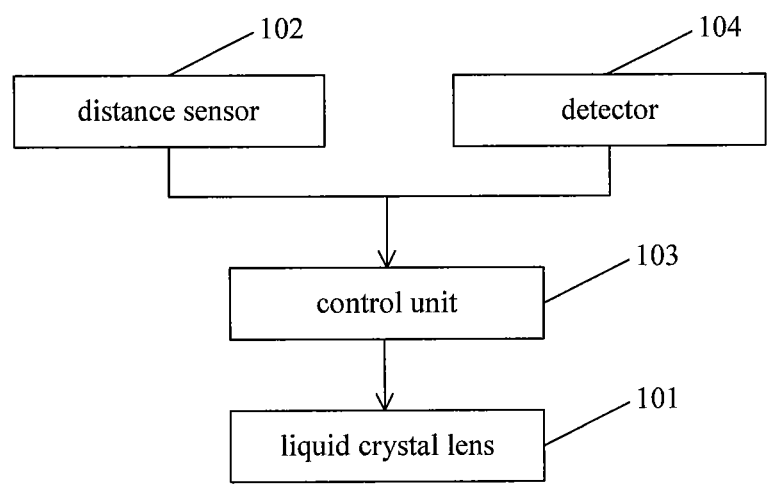
FIG. 19 is a structure diagram of the liquid crystal spectacles according to other embodiments of the present disclosure.

As shown in FIG. 19, apart from the liquid crystal lens, the liquid crystal spectacles can further comprise a sensor unit 102 and a controller 103, wherein the sensor unit 102 comprises a plurality of distance sensors, wherein each of the distance sensors is connected with the controller 103, and configured for detecting a distance between the distance sensor and human eyes and transmitting the distance to the controller 103. Besides, the controller 103 is configured for determining a focal distance of human eyes based on the distance between the sensor unit 102 and the human eyes, and calculating voltages to be provided to the electrode unit based on the focal distance of human eyes, thereby adjusting a focal distance of the Fresnel lens. In this case, by arranging the distance sensors and the controller 103, automatic distance measurement can be achieved, and different voltages can be applied to the electrodes upon different applications.

In the liquid crystal lens having an emotion expression function, the liquid crystal spectacles can further comprise a detector 104, as shown in FIG. 19. The detector 104 is configured for detecting a physiological state of human body and feeding it back to the controller. Furthermore, the controller 103 controls the liquid crystal lens to display an emotion pattern corresponding to the physiological state based on the physiological state fed back by the detector 104. In this way, by arranging a detector 104 configured for collecting emotion information, the electrochromic layer can display respective emotions in real time.

Figure 18:
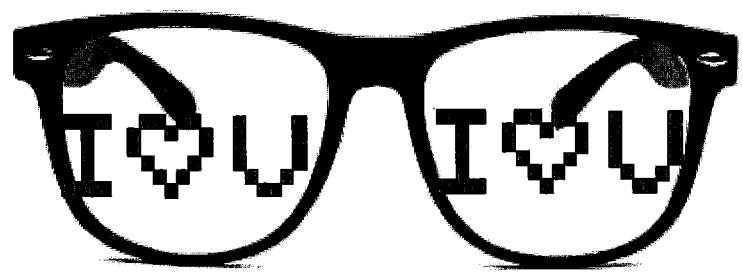
FIG. 18 is a schematic view of an emotion pattern in the liquid crystal lens according to other embodiments of the present disclosure.

In the liquid crystal spectacles, the detector 104 can comprise a camera head and optionally a pulse monitor or a heart rate detector. In this case, by detecting a body temperature or heartbeat of a person in combination with information captured or real objects seen by the human eyes, patterns expressing emotions, such as smiling faces or crying faces expressing delight or sadness, can be displayed, for example, the pattern as shown in FIG. 18.

In the liquid crystal spectacles according to the current embodiment, the adjustment function and the emotion expression function of the planar second common electrode are independent of each other. For the adjustment of vision, the adjustment of liquid crystal spectacles in the embodiments as described above can be referred to, which will not be repeated herein for simplicity.

In the liquid crystal spectacles according to the current embodiment, a patterned electrochromic material is deposited on the liquid crystal lens, and thereby liquid crystal spectacles comprising an image display function are obtained. For example, when people see things that they like, information expressing emotions can be sent out. This makes the spectacles a function product capable of feeding back emotions or needs of a wearer in real time. Besides, this also provides the liquid crystal spectacles with an entertainment function.

It can be understood that the above embodiments are only exemplary embodiments adopted for illustrating the principle of the present disclosure, but the present disclosure is not limited thereto. For a person having ordinary skills in the art, various variations and improvements can be made without deviating from the spirit and essence of the present disclosure, and these variations and improvements also fall within the protection scope of the present disclosure.

LIST OF REFERENCE NUMERALS

1 first substrate
11 first base plate
12 first common electrode
13 first insulating layer
14 first pixel electrode
2 second substrate
21 second base plate
22 second common electrode
23 second insulating layer
24 second pixel electrode
3 liquid crystal layer
4 third substrate
41 electrolyte layer
42 electrochromic layer
43 third electrode
44 third base plate
5 5' spacer
101 liquid crystal lens
102 sensor unit
103 controller
104 detector

The invention claimed is:

1. A liquid crystal lens, comprising:
a first substrate and a second substrate that is opposite the first substrate;
a mono-layered liquid crystal cell between the first substrate and the second substrate; and
an electrode unit comprising a first electrode and a second electrode,
wherein at least one of the first electrode and the second electrode comprises an annular electrode,
wherein the first electrode is on a side of the first substrate facing the second substrate and the second electrode is on a side of the second substrate facing the first substrate, and
wherein liquid crystals in the mono-layered liquid crystal cell are configured to form a Fresnel lens with an adjustable focal distance under an effect of the first electrode and the second electrode,
wherein the first electrode comprises a first pixel electrode, wherein the first pixel electrode comprises a plurality of first annular electrodes comprising the first annular electrode and arranged concentrically at intervals, wherein respective distances between adjacent first annular electrodes are equal, and
wherein the second electrode comprises a second pixel electrode, wherein the second pixel electrode comprises a plurality of second annular electrodes comprising the second annular electrode and arranged concentrically at intervals and corresponding to respective ones of the first annular electrodes, wherein respective distances between adjacent second annular electrodes are equal,
the liquid crystal lens further comprising:
an electrochromic layer and a third electrode arranged sequentially on a side of the second substrate facing away from the mono-layered liquid crystal cell,
wherein the electrochromic layer is configured to form an emotion pattern when a voltage is applied to the third electrode.

2. The liquid crystal lens according to claim 1,
wherein the first electrode further comprises a first common electrode,
wherein the first pixel electrode comprises a first annular electrode and the first common electrode comprises a first planar electrode,
wherein the second electrode further comprises a second common electrode,
wherein the second pixel electrode comprises a second annular electrode and the second common electrode comprises a second planar electrode, and
wherein the liquid crystals in the mono-layered liquid crystal cell comprise nematic liquid crystals or smectic liquid crystals.

3. The liquid crystal lens according to claim 2, further comprising:

a first alignment film on the side of the first substrate facing the second substrate and proximate to the mono-layered liquid crystal cell; and a second alignment film on the side of the second substrate facing the first substrate and proximate to the mono-layered liquid crystal cell, wherein a first alignment direction of the first alignment film is perpendicular to a second alignment direction of the second alignment film.

4. The liquid crystal lens according to claim 1, further comprising:

a plurality of first annular spacers at intervals on the side of the first substrate facing the second substrate; and a plurality of second annular spacers at intervals on the side of the second substrate facing the first substrate, wherein the liquid crystals in the mono-layered liquid crystal cell are configured to form a curve describing liquid crystal delays under the effect of the first electrode and the second electrode, wherein the curve describing liquid crystal delays comprises a plurality of peak-valley descending segments and a plurality of valley-peak ascending segments, and wherein ones of the plurality of first annular spacers and ones of the plurality of second annular spacers are at a peak-valley descending segment or a valley-peak ascending segment, to form a convex Fresnel lens or a concave Fresnel lens.

5. The liquid crystal lens according to claim 4, wherein the first annular electrodes are circular or elliptic.

6. The liquid crystal lens according to claim 1, wherein the first electrode comprises a first pixel electrode, the first pixel electrode comprising the annular electrode, wherein the second electrode comprises a second common electrode, the second common electrode comprising a planar electrode, and wherein the liquid crystals in the mono-layered liquid crystal cell comprise blue phase liquid crystals.

7. The liquid crystal lens according to claim 6, wherein the first pixel electrode comprises a plurality of first annular electrodes comprising the annular electrode and arranged concentrically at intervals, wherein distances between adjacent ones of the first annular electrodes are equal.

8. The liquid crystal lens according to claim 7, further comprising:

a plurality of annular spacers arranged at intervals on the side of the first substrate facing the second substrate, wherein the liquid crystals in the mono-layered liquid crystal cell are configured to form a curve describing liquid crystal delays under an effect of the first electrode and the second electrode, wherein the curve describing liquid crystal delays comprises a plurality of peak-valley descending segments and a plurality of valley-peak ascending segments, and wherein ones of the annular spacers are arranged at respective ones of the peak-valley descending segments or at respective ones of the valley-peak ascending segments, to form a convex Fresnel lens or a concave Fresnel lens.

9. The liquid crystal lens according to claim 8, wherein the first annular electrodes are circular or elliptic.

10. The liquid crystal lens according to claim 7, wherein the first annular electrodes are circular or elliptic.

11. The liquid crystal lens according to claim 1, wherein the first annular electrodes are circular or elliptic.

12. The liquid crystal lens according to claim 1, wherein the first substrate comprises a first base plate, and the second substrate comprises a second base plate, and wherein the first base plate and the second base plate comprise respective transparent flexible base plates.

13. The liquid crystal lens according to claim 1, wherein the third electrode comprises a plurality of block sub-electrodes in an array.

14. The liquid crystal lens according to claim 1, wherein the electrochromic layer comprises a tungsten trioxide layer and an electrolyte layer.

15. Liquid crystal spectacles, comprising the liquid crystal lens according to claim 1.

16. The liquid crystal spectacles according to claim 15, further comprising:

a sensor unit; and a controller, wherein the sensor unit comprises a plurality of distance sensors, wherein ones of the distance sensors are connected with the controller, and are configured to detect respective distances between the ones of the distance sensors and human eyes and are configured to transmit the respective distances to the controller, and wherein the controller is configured a to calculate a focal distance of human eyes based on the respective distances, and configured to calculate respective voltages to provide to the first electrode and the second electrode based on the focal distance of human eyes, thereby adjusting a focal distance of the Fresnel lens.

17. The liquid crystal spectacles according to claim 16, further comprising:

a detector, wherein the detector is configured for detecting a physiological state of a human body and configured to feed the physiological state of the human body back to the controller, and wherein the controller controls the liquid crystal lens to display an emotion pattern corresponding to the physiological state of the human body that was fed back by the detector.

* * * * *